J. STEHR.
DEMOUNTABLE RIM.
APPLICATION FILED DEC. 17, 1914.
1,144,260.
Patented June 22, 1915.
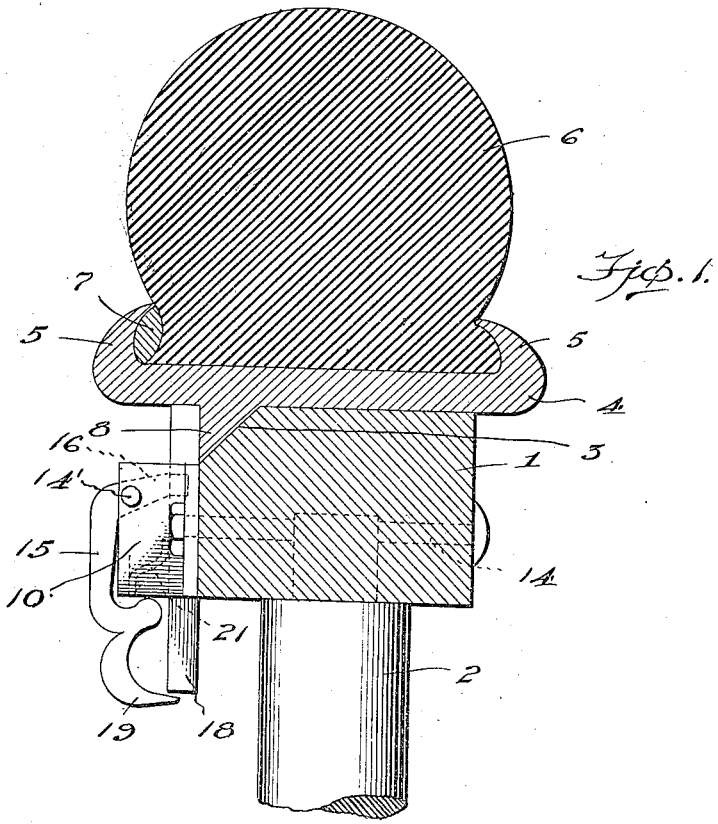
Fig. 1.
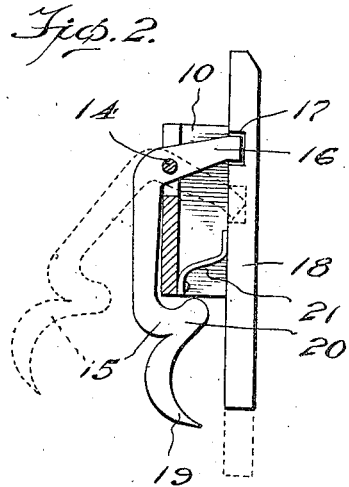
Fig. 2.
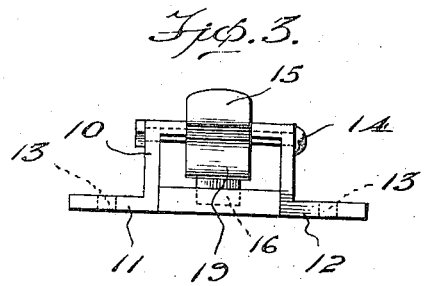
Fig. 3.
Witnesses
Paul M. Hunt
Rob. S. Meyer
Inventor
J. Stehr.
By 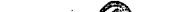
Attorney

UNITED STATES PATENT OFFICE.

JOSEPH STEHR, OF CINCINNATI, OHIO.

DEMOUNTABLE RIM.

1,144,260.

Specification of Letters Patent.   Patented June 22, 1915.

Application filed December 17, 1914.   Serial No. 877,719.

*To all whom it may concern:*

Be it known that I, JOSEPH STEHR, residing at Cincinnati, in the county of Hamilton and State of Ohio, have invented certain new and useful Improvements in Demountable Rims; and I do hereby declare the following to be a full, clear, and exact description of the invention, such as will enable others skilled in the art to which it appertains to make and use the same.

This invention relates to demountable rims for vehicle wheels, and more particularly to a rim for mounting upon an automobile wheel, by means of which the pneumatic tire upon the wheel may be easily and quickly removed in case of puncture, blowout or the like and speedily replaced by a perfect tire.

Another object of this invention is to provide a demountable rim as specified which does not embody bolts and which is held attached to the felly of the wheel by slidable tongues which are operated by peculiarly shaped fingers for hand levers for releasing the demountable rim for disconnection with the wheel.

With the foregoing and other objects in view this invention consists in such novel features of construction, combination and arrangement of parts as will be hereinafter more fully described, illustrated in the accompanying drawings and claimed.

In describing the invention in detail reference will be had to the accompanying drawings wherein like characters designate like or corresponding parts throughout the several views, and in which:

Figure 1 is a cross sectional view through a fragment of a wheel showing the improved demountable rim and the mechanism for permitting of the demounting of the rim in elevation. Fig. 2 is a side elevation of the improved mechanism for holding the demountable rim upon an ordinary wheel felly, and Fig. 3 is an end view of Fig. 2.

Referring more particularly to the drawings, 1 designates the felly of an ordinary vehicle wheel 2. The felly 1 has the upper outer corner thereof cut away as is shown at 3, having its sides inclined. The felly 1 has a rim 4 mounted thereupon, which rim has its marginal edges upturned as at 5 so as to hold an ordinary type of pneumatic or cushioning tire 6 thereupon. An auxiliary band 7 is positioned within one side of the rim 4 and engages the edge of the tire 6 for securely holding the tire mounted within the rim 4.

The rim 4 has a projection 8 formed thereupon, which extends completely about the inner circumference of the rim and is substantially triangular shaped in cross section. The projection 8 is provided for seating in the space formed by the cutting away of the corner of the felly 1 as is shown at 3. The inner side of the flange 8 is inclined for firm abutting engagement against the inclined outer surface or wall of the cut away portion 3, as is clearly shown in Fig. 1 of the drawing.

The felly 1 has secured thereto at spaced intervals about its length brackets 10 which are substantially U-shaped and have transversely extending flanges 11 and 12 formed at the terminus of the leg thereof. The flanges 11 and 12 are provided with openings 13, through which bolts 14 extend. The bolts 14 extend laterally through the felly 1 and hold the bracket 10 securely connected to the outer surface or side of the felly, as is clearly shown in Fig. 1 of the drawings. The brackets 10 have bolts 14' carried thereby, which bolts pivotally support levers 15. The levers 15 are pivoted intermediate of their ends, and the ends 16 thereof extend inwardly toward the felly 1 and are seated in notches 17 which are formed in sliding tongues 18. The sliding tongues 18 are carried by the brackets 10 and positioned between the facing sides of the legs thereof and further engage the outer surface of the felly 1 and the outer surface of the depending flange 8 which is formed upon the rim 4, for securely holding the flange in the cut out portion 3.

The levers 15 have finger gripping handles 19 formed thereupon, and inwardly extending lugs 20 formed at the conjunction between the lever body proper and the handle portion 19, which engage the bracket 10 and prevent accidental pivotal movement of the lever.

Flat springs 21 are secured to the inner surface of the apex of the brackets 10 and extend downwardly and engage the outer surface of the tongues 18, for securely holding these tongues in engagement with the outer side of the felly and the flange 8 and prevent independent sliding movement of the tongue, except upon movement of the lever 15.

In the operation of the improved demountable rim; when it is desired to detach or demount a rim from a vehicle wheel for the purpose of replacing the tire carried thereby, the levers 15 are moved upon their pivotal points or pins 14 to the position indicated in dotted lines in Fig. 2 of the drawings. The outward movement of the levers 15 will move the ends 16 downwardly and consequently slide the tongues 18 downwardly and out of engagement with the flange 8, which will permit the rim 4 to be slid or moved off the periphery of the felly 1 for interchanging, for mounting a new or perfect tire upon the rim in a short space of time.

From the foregoing description taken in connection with the accompanying drawings the advantages of construction and of the method of operation of the improved demountable rim will be readily apparent to those skilled in the art to which this invention appertains and, while in the foregoing description, the principle of the operation of this invention has been described together with various features of construction, it is to be understood that certain minor features of construction, combination and arrangement of parts may be altered to suit practical conditions provided such alterations are comprehended within the scope of what is claimed.

What is claimed is:—

1. In a demountable wheel rim structure, the combination with a vehicle wheel having a felly, said felly having its upper outer corner cut away, of a tire carrying rim, a flange formed integrally with the inner surface of said rim and depending therefrom, said flange provided for seating against the cut away corner of said felly, a plurality of U-shaped brackets detachably carried by said felly, levers pivotally carried by said brackets, said levers connected to said tongues for moving said tongues into or out of engagement with said flange for holding said rim upon said felly for permitting of removal therefrom, and flat springs carried by said brackets and engaging said tongues for holding said tongues in engagement with the side of said felly and said flange.

2. In a demountable wheel rim structure, the combination with a vehicle wheel having a felly, said felly having its upper outer corner cut away, of a tire carrying rim, a flange formed integrally with the inner surface of said rim and depending therefrom, said flange provided for seating against the cut away corner of said felly, a plurality of U-shaped brackets detachably carried by said felly, levers pivotally carried by said brackets, said levers connected to said tongues for moving said tongues into or out of engagement with said flange for holding said rim upon said felly for permitting of removal therefrom, and flat springs carried by said brackets and engaging said tongues for holding said tongues in engagement with the sides of said felly and said flange, said levers each having an arcuate finger engaging handle formed integrally therewith, a lug formed upon said lever at the conjunction of said handle and the lever body for engagement with said brackets for holding said levers against accidental pivotal movement.

In testimony whereof I affix my signature in presence of two witnesses.

JOSEPH STEHR.

Witnesses:
HENRY G. HAND, Jr.,
BESSIE WILLIAMS.